R. W. E. HAYES.
ATTACHMENT FOR SPRAY RODS.
APPLICATION FILED JULY 12, 1916.
1,225,029.
Patented May 8, 1917.
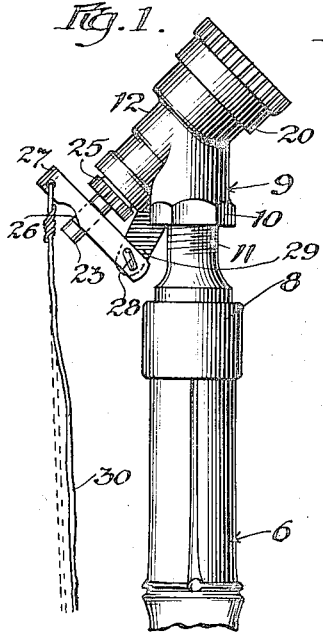
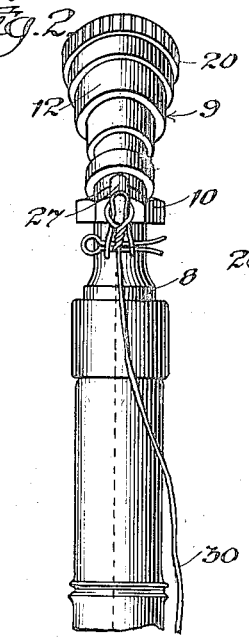
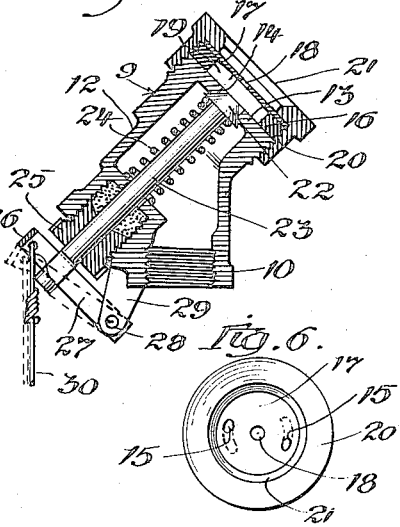
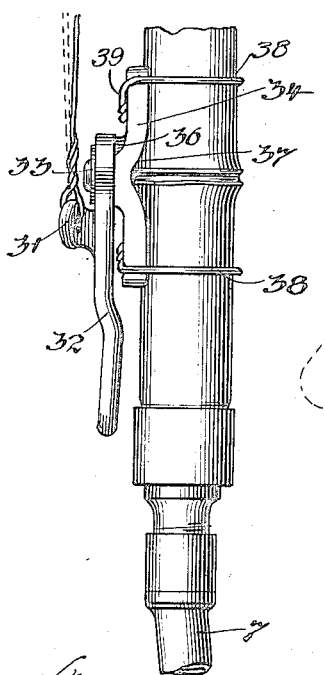
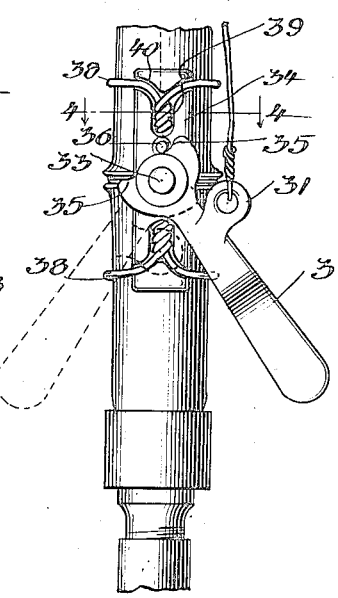
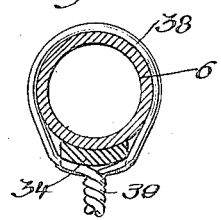
Inventor:
Ralph W. E. Hayes.
By
Attorney.

UNITED STATES PATENT OFFICE.

RALPH W. E. HAYES, OF GALVA, ILLINOIS, ASSIGNOR OF ONE-HALF TO HAYES PUMP & PLANTER COMPANY, OF GALVA, ILLINOIS, A CORPORATION OF ILLINOIS.

ATTACHMENT FOR SPRAY-RODS.

1,225,029.            Specification of Letters Patent.        Patented May 8, 1917.

Application filed July 12, 1916. Serial No. 108,842.

*To all whom it may concern:*

Be it known that I, RALPH W. E. HAYES, a citizen of the United States, residing at Galva, in the county of Henry and State of Illinois, have invented certain new and useful Improvements in Attachments for Spray-Rods, of which the following is a specification.

The present invention relates more particularly to certain appliances for use in connection with spray rods, to control in a quick and easy manner the form in which the liquid is discharged from the spray nozzle.

The primary objects of the invention are, to provide a nozzle which will be capable of adjustment to throw a long, narrow spray, or a wide-angle, cone-shaped spray; and to provide means for quickly and easily changing from one form of spray to the other.

Further objects of the invention are, to inclose within a housing the spring or other resilient member which forms part of the nozzle control mechanism, thereby eliminating the danger of its catching on the branches, etc., and breaking; to provide a finger-piece which can be shifted from one position to another, and which will remain in its shifted position without being so held by the operator; to provide a connection between this finger-piece and a swinging arm or member, which arm in turn will actuate the controlling member, thus converting the swinging movement of the finger-piece into a rectilinear movement capable of actuating the controlling piece; and to provide a carrying member for the finger-piece, and means for quickly and easily attaching this carrying member to the spray rod in a manner whereby the rod is neither fractured nor injured.

A further object of the invention lies in the compactness and strength of the various parts of the device and their simplicity of operation, eliminating the danger of breakage from defective structures.

The invention further consists in the features of construction and combination of parts hereinafter described and claimed.

In the drawings:

Figure 1 is a side elevation, showing a spray rod with the attachments of the present invention applied thereto;

Fig. 2, a front view of the parts shown in Fig. 1;

Fig. 3, a longitudinal section through the nozzle and the swinging arm which operates the same;

Fig. 4, a cross section on line 4—4 of Fig. 2, looking in the direction of the arrows;

Fig. 5, a detail showing the method in which the wire is initially placed upon the supporting member for the finger-piece; and Fig. 6, a face view of the discharge end of the barrel of the nozzle.

In the art to which the present invention relates, it has been found desirable to employ a form of nozzle in connection with the hollow spray rods which would be capable of projecting the liquid in two different manners, first, in the form of a long, narrow spray, which would be capable of reaching the branches of the higher trees, and, second, in the form of a wide-angle, cone-shaped spray which would cover a large amount of surface in a short time; and it has been found desirable to provide means for regulating the nozzle to change from the long spray to the funnel-shaped spray from time to time, as desired. The present invention relates principally to means for effecting this change in the form of liquid discharge from the nozzle, and to the construction and arrangement of the parts constituting such means.

Referring now to the drawings, the appliances are shown in conjunction with a spray rod 6, which, as shown, is made of bamboo, it being a very desirable, well-known material for use in this particular form of device. These rods 6, at their lower end, communicate with a flexible member 7 extending from the source of fluid supply, and the fluid is forced from this source of supply and into the rods under pressure.

Attached to the upper end of the rod is a nipple 8, which receives a nozzle 9. This nozzle, as shown, is formed with a tapped sleeve 10 secured onto the threaded portion 11 of the nipple 8; and angularly disposed to this sleeve 9 is a barrel 12 which contains the operative portions of the nozzle. The upper end of this barrel is formed with a cross-wall 13, having a central opening 14, and spiral openings 15 arranged circumferentially around the central opening. Above this cross-wall is placed a packing ring 16, and upon the packing ring is set a plate 17 with a central opening 18. There is thus provided between the plate 17 and cross-wall 13 a space or chamber 19. The plate 17 and packing ring 16 are held in place by means of a threaded cap-piece 20 cut away on its upper face to provide an opening 21.

For controlling the central opening 14 in the cross-wall 13, I provide a tapered valve plug 22 carried by a stem 23. A spring or other suitable tension member 24 acts to normally hold this valve in position where the plug or head closes the opening 14, as will be apparent from Fig. 3. It will be noted that this spring is lying within the chamber of the nozzle barrel 12 and hence is inclosed, where it could not come in contact and become entangled with the limbs or branches of the trees or bushes.

The stem 23 passes through a stuffing box 25 at the lower end of the barrel 12, and adjacent the lower end of the stem are formed recesses 26, which, as shown, receive the sides of a split arm 27. This arm is pivoted at 28 to a lug 29 depending from the sleeve 10. To the outer end of this arm is attached one end of a flexible wire or other suitable cable 30, which wire or cable, at its other end, is connected to an eye 31 in a swinging finger-piece 32. This finger-piece is mounted to swing about a pin or stud 33 carried by a plate-like carrying member 34; and shoulders or abutments 35 are provided on the finger-piece, adapted to engage with a stop pin 36 on the member 34.

It will be apparent that when this swinging member is placed either in the position shown in full lines or dotted lines in Fig. 2, it will maintain itself locked in this position, being moved across its pivotal center in each instance. Therefore, when shifted into one position or the other, it will so remain until shifted back, whereby the operator need not maintain his finger in engagement with the same to hold it in a given position.

As previously stated, the rod 6 is made of bamboo. The character of this material renders it practically impossible to place screws or nails therein, owing to the very thin shell and the hardness of the material, and its liability to crack when a nail or screw is placed therein, and hence leak. The carrying plate 34 is formed on its under face with a recessed portion 37, which, when the carrying member is put in position, lies over one of the joints of the bamboo rod. This prevents it from moving longitudinally of the rod when secured in place. To secure this carrying member in place, I take wires 38, wrap them transversely around the outside of the pole and into grooves 40 on the carrying member, as will be apparent from Figs. 2 and 5. The wires are then twisted, and the twisted ends are forced down into recesses 39 on the front of the carrying members 34, and when so forced down are clenched in position, so that they will not be shifted out of place during ordinary usage. I thus provide a strong and efficient means for securing this carrying member in position without the use of screws or nails, which, as stated, are not practical of application with a bamboo rod. Although this method of attachment will hold the finger-piece securely in place, it is not of such a nature as to prevent the removal of the carrying member and finger-piece when desired, or necessary.

When the finger-piece is swung from the full line position to the dotted line position of Fig. 2, it will obviously move the eye 31 in a downward circular path of travel, pulling the wire or cable 30 downward, which pulls the outer end of the arm 27 downward, thereby actuating the stem 23 and removing the tapered plug 22 from the opening 14, allowing the liquid to pass directly through this opening and the opening 18, whereby it emerges in the form of a long, narrow spray. When the finger is in the full line position, the arm 27 is in the position shown in full lines in Fig. 1 and Fig. 3, which position allows the stem to move inward and seat the tapered plug 22. This closes the opening 14 and the liquid thereby passes through the spiral openings 15 and into the chamber 19 with a whirling movement, so that when it finally passes out through the opening 18 it is in the form of a conical spray. Thus, the form in which the liquid emerges from the nozzle is changed at the will of the operator, and in a quick and simple manner.

By the use of the swinging arm 27, it is obvious that a direct pull is given to the stem 23, which moves it in a rectilinear path, although the prime mover, which is the finger-piece 32, is swung in a circular path. This is deemed to be of importance, since it would be impractical to operate the stem 23 through a direct connection with the wire 30, and hence means have to be provided for transferring the movement of the finger-piece 32 to the stem 23, so as to impart to the latter a pull tending to move it with a rectilinear movement.

The appliance is susceptible of changes and modifications, provided the structure is maintained within the scope of the appended claims.

It will be noted that the axial center of the pivot for the finger-piece 32 is at right angles to the axial center of the arm 27. Thus, the finger-piece swings back and forth across the plane in which the arm is lying, actuating the arm in the manner desired. The lower end of the spring 24 rests on a washer 24ᵃ. This enables an easy assemblance and disassemblance, and also keeps the packing beneath the washer pressed tight by the spring pressure on the washer, eliminating the packing getting dry by failure to turn the gland nut and compress it.

I claim:

1. The combination with a spray rod, of a nozzle mounted on the end of the rod, means for changing the form in which the liquid is projected from the nozzle, said means including a slidable stem, a pivoted arm carried by the nozzle and adapted to engage the stem, a pivoted finger-piece, the axis of the finger-piece extending at right angles to the axis of the arm, and a connection between the finger-piece and arm, substantially as described.

2. The combination with a bamboo spray rod, of a nozzle mounted on the end of the rod, movable means for changing the form in which the liquid is projected from the nozzle, a finger-piece, a connection between the finger-piece and said means for changing the form of the liquid projected from the nozzle, a plate-like carrying member for the finger-piece, said carrying member having grooves formed therein, and a wire for securing said carrying member to the spray rod, said wire resting, when the carrying member is attached, within the grooves in said carrying member, substantially as described.

3. The combination with a bamboo spray rod, of a nozzle mounted on the end of the rod, movable means for changing the form in which the liquid is projected from the nozzle, a finger-piece, a connection between said finger-piece and said means for changing the form of the liquid projected from the nozzle, a plate-like carrying member for the finger-piece, said carrying member being formed with a recessed portion adapted to fit over a joint in the spray rod, and an encircling member for securing said carrying member to the spray rod, substantially as described.

4. The combination with a bamboo spray rod, of a nozzle mounted on the end of the rod, movable means for changing the form in which the liquid is projected from the nozzle, a finger-piece, a connection between the finger-piece and the means for changing the form of the liquid projected from the nozzle, a carrying member for the finger-piece, comprising a plate formed with grooves extending from opposite edges thereof and merging into a recess, a wire for securing the plate to the pole, said wire passing around the pole and resting within the grooves in the plate, the end of the wire being twisted and forced into the recess of the plate, substantially as described.

5. The combination with a spray rod, of a nozzle mounted on the end of the rod, means for changing the form in which the liquid is projected from the nozzle, said means including a slidable stem, tension mechanism tending to move the stem to closed position, a swinging finger-piece, a pivoted member engaging the stem, a connection between said finger-piece and pivoted member, said finger-piece when moved to thrown position passing across and beyond its center of movement and carrying the point of securance between it and the connection across said center, and said tension mechanism acting through said pivoted member and connection to exert a pull on the finger-piece, tending to hold it in thrown position, substantially as described.

6. The combination with spray rod, of a nozzle mounted on the end of the rod, means for changing the form in which the liquid is projected from the nozzle, said means including a slidable stem, tension means tending normally to hold the stem in closed position, a pivoted finger-piece, a connection between the finger-piece and stem, said finger-piece when thrown from one position to the other moving across its pivotal center and carrying the point of securance between it and said connection across said center, said connection upon such movement acting to move the stem against the resistance of the tension means, and the power so created in the tension means acting through the connection to maintain a pressure upon the finger-piece, which holds it in thrown position, substantially as described.

7. In combination with a spray rod, a nozzle mounted on the end of the rod, means for changing the form in which the liquid is projected from the nozzle, said means including a slidable stem, a pivoted member engaging the stem, a mounting for said member permitting it to swing in a direction lengthwise of the axis of the rod, and in a path lying entirely to one side of the rod, a pivoted finger-piece at the lower end portion of the rod, a mounting for the finger-piece permitting it to swing in a direction crosswise of the axis of the stem and in a path extending across the stem to both sides thereof, and a connection between the finger-piece and pivoted member, substantially as described.

RALPH W. E. HAYES.